United States Patent

Gauvin

[15] 3,656,700

[45] Apr. 18, 1972

[54] APPARATUS FOR WINDING STORING AND DISTRIBUTING PUNCHED PAPER TAPE

[72] Inventor: Robert D. Gauvin, Minneapolis, Minn.

[73] Assignee: Metro Machine & Engineering Corp., Minneapolis, Minn.

[22] Filed: June 24, 1970

[21] Appl. No.: 49,265

[52] U.S. Cl. ....................242/67.1, 242/55.18, 242/68.3

[51] Int. Cl. ....................B65h 17/02

[58] Field of Search ....................242/55.18, 71.1, 197, 67.1, 242/55, 84.8, 68.3

[56] References Cited

UNITED STATES PATENTS

| | | | |
|---|---|---|---|
| 1,031,129 | 7/1912 | Lloyd | 242/55.18 |
| 1,592,030 | 7/1926 | Langsner | 242/84.8 |
| 1,426,290 | 8/1922 | Gottschau | 242/55.18 |
| 2,962,240 | 11/1960 | McGayhey et al. | 242/55.18 |
| 3,424,390 | 1/1969 | Lyhus | 242/55 |
| 3,502,283 | 3/1970 | Gross | 242/197 |

*Primary Examiner*—Stanley N. Gilreath
*Assistant Examiner*—Milton Gerstein
*Attorney*—Merchant & Gould

[57] ABSTRACT

A device for handling punched paper tape is disclosed which consists of a closed cartridge to be selectively used with a reel having a spindle to receive the tape and form it into a roll within the cartridge for storage purposes, or with a mounting bracket that carries the cartridge and permits it to be rotated as tape is withdrawn from the center of the tape roll.

10 Claims, 8 Drawing Figures

INVENTOR.
ROBERT D. GAUVIN
BY
Merchant & Gould
ATTORNEYS

APPARATUS FOR WINDING STORING AND DISTRIBUTING PUNCHED PAPER TAPE

The invention is broadly related to storage containers for tape and the like, and specifically contemplates a cartridge for windably receiving, storing and rotatably distributing a spool or roll of punched paper tape.

Punched paper tape is a useful input medium finding particular application with numerical control equipment, automatic office machines and computer peripheral equipment. The tape is coded by properly located punchings which are read by an input transducer to control the machine in a desired manner.

Where long and complex programs are involved, the extreme tape length oftens gives rise to the problem of handling the tape properly and efficiently, both as it enters and leaves the machine. If the tape is to be used again, as is often the case, it must be gathered up, re-formed in a suitable manner and stored. When reused, it must be properly transferred from the storage container to the machine.

Many machines that are controlled by punched paper tape do not include apparatus for unwinding and rewinding a roll of tape. Thus, it is necessary to carry out these tasks manually, which is both time consuming and extremely inconvenient. For this reason, I have devised a cartridge container which is selectively used with a mounting bracket assembly and rotates relative thereto as tape is unwound from the roll, or with a reel having a spindle which is insertable into the cartridge to rewind the tape, and which is removable to leave the tape in a roll within the cartridge for storage purposes.

The apparatus is both simple and efficient to use, inex pensive to manufacture, does away with the time-consuming manual tasks and obviates transferring the tape from one device to another during the various operations.

DESCRIPTION OF THE PREFERRED EMBODIMENT

Figures 1, 2, 3, 4, 5, 6, 7, 8:
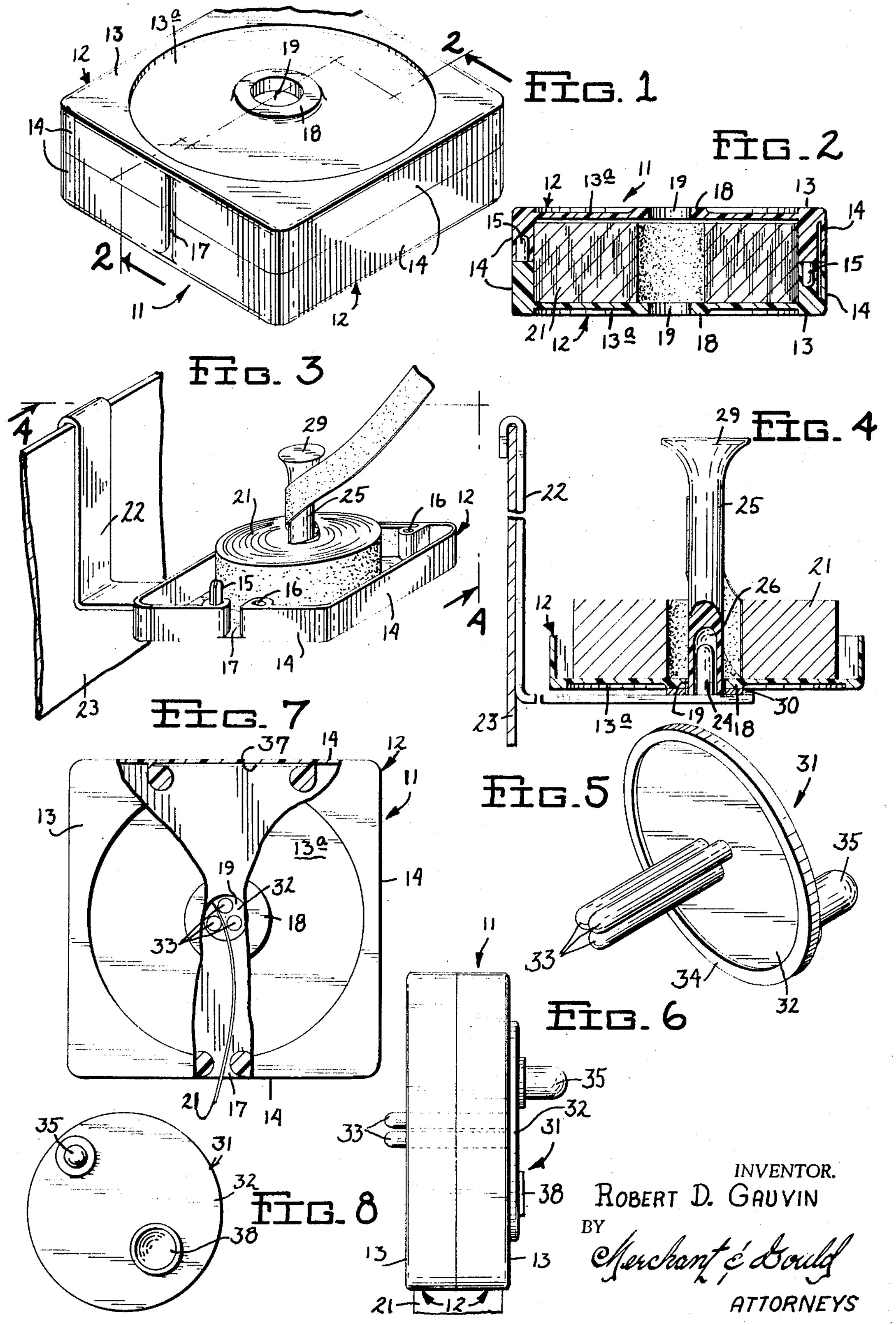
FIG. 1 is a perspective view of a cartridge container constructed to receive, store and distribute a roll of punched paper tape.
FIG. 2 is a cross-sectional view of the cartridge container taken generally along the line 2—2 of Figure 1.
FIG. 3 is a perspective view of the cartridge container in an opened position and used in combination with a mounting bracket to permit the withdrawal of punched paper tape.
FIG. 4 is a sectional view of the cartridge container and mounting bracket taken along the line 4—4 of FIG. 3.
FIG. 5 is a perspective view of a winding reel used in combination with the cartridge container.
FIG. 6 is a side view of the cartridge container in combination with the reel.
FIG. 7 is a top view of the cartridge container-reel combination, parts thereof being broken away.
FIG. 8 is a top view of the winding reel.

In FIGS. 1 and 2, a cartridge container represented generally by the numeral 11 is shown consisting of a pair of identical members 12 one of which serves as a base with the other forming a cover therefor. Each member 12 has a generally flat portion 13 with retaining side walls 14 formed around its periphery. A circular recess 13*a* is formed in flat portion 13, the purpose of which will be described below.

Each member 12 includes a pair of pintles 15 projecting from opposite disposed side walls 14, and a pair of pintle-receiving sockets 16 disposed to permit the members 12 to frictionally engage and form a closed container when brought together. It should also be noted that the associated pintle 15-socket 16 pairs are spaced differently on the oppositely disposed sides 14 to permit the members 12 to be brought together in but a single aligned position. The pair disposed furthest apart are also constructed to form a slotted recess therebetween which is flush with side wall 14 and arranged to receive an identification tag or label 37, as best seen in FIG. 7.

Each of the members 12 has formed in one of its side walls 14 a slot 17 equidistantly disposed between corners to align with a corresponding slot 17 in the opposite member 12 and thereby form a full slot of predetermined dimension.

Projecting slightly upward from the recess 13*a* and at its center is an annular bearing surface 18 which defines an opening 19.

Referring additionally to FIGS. 3 and 4, a roll 21 of punched paper tape is disposed in the bottom member 12, which is rotatably carried by an L-shape bracket 22. As best seen in FIG. 3, the vertical leg of bracket 22 is bent over to form a hooking member for mounting on a wall 23. Projecting upwardly from the outer end of the horizontal extension of bracket 22 is a pintle 24 which is received through the opening 19 of member 12. Surrounding pintle 24 at its base is a washer 30 having a diameter essentially the same as that of surface 18, which it receives in bearing relation. A center post 25 having a socket 26 fits over pintle 24 and is supported thereby to hold cartridge 11 in place. The upper end of center post 25 expands into a head portion 29.

A reel for container 11 is represented generally by numeral 31 in FIG. 5. Reel 31 consists of a round base plate 32 from which projects a spindle formed from three spaced, parallel fingers 33. The cross-sectional dimension of fingers 33 and their arrangement on the flat portion 32 of reel 31 is chosen to permit their insertion into the opening 19 of a member 12. As best seen in FIG. 6, fingers 33 are long enough to extend through both openings 19 of a cartridge container 11 and project beyond.

FIG. 5 shows flat portion 32 to have a raised peripheral edge 34 which is sized to fit within recess 13*a*. Thus, with reel 31 properly inserted into a container 11, flat portion 32 is received by and bears against the surface of recess 13*a*, while the area immediately surrounding the base of fingers 33 bears against annular surface 18.

Projecting from the opposite side of flat portion 32 is a handle 35 which permits manual rotation of reel 31 with respect to cartridge 11. Reel 31 also includes a depression 38 in flat portion 32 to enable rotation with the operator's finger (FIG. 8).

In operation, cartridge container 11 is selectively used in combination with bracket 22 and center post 25, or with reel 31. If a roll 21 of punched paper tape has been used and is ready for storage, its leading end is inserted through slots 17, 17 and passed through fingers 33 (see FIG. 7). This initiates the formation of a tape roll, which is carried out by rotating reel 31 by handle 35. After the entire length of tape has been made into a roll reel 31 is removed, and the roll 21 of punched paper tape is stored in the closed cartridge container 11.

When a stored roll 21 of tape is needed, the member 12 serving as a cover is removed and the remaining member 12 is placed over pintle 24 of bracket 22 as shown in FIGS. 3 and 4. Center post 25 is then placed over pintle 24 and the upper end of bracket 22 is hung from an available wall edge. The inner end of roll 21 is then drawn out and around center post 25, and as it is fed into the machine member 12 rotates allowing roll 21 to be unwound. Head portion 29 of center post 25 guides and maintains the tape in proper feed-in position.

I claim

1. Apparatus for storing and distributing tape of a predetermined width, comprising:

a. a cartridge having a retaining side wall and a bottom, the cartridge constructed and arranged to accommodate a roll of said tape;

b. the cartridge side wall having a slotted opening through which the tape can pass;

c. the cartridge bottom having an opening centrally disposed to cooperate with the center of the tape roll, and a bearing surface oriented with respect to the central opening;

d. a bracket member constructed for removable mounting on a stationary object and having a horizontal leg portion for supporting the cartridge for rotatable movement about an axis passing through said bottom opening, said horizontal leg portion having a bearing surface cooperable with the bearing surface of the cartridge;

e. and a center post removable carried by the horizontal leg portion on said axis, the center post constructed and arranged to project through the cartridge bottom opening at a point above the cartridge side walls.

2. Apparatus as defined by claim 1, wherein the center post further comprises an enlarged head portion for guiding the tape.

3. The apparatus defined by claim 1, wherein:

a. the bracket member further comprises a vertical leg terminating in a hooking member for said removable mounting of the bracket member.

4. The apparatus defined by claim 1, wherein the horizontal leg portion of the bracket member includes an upwardly projecting pintle, and the center post has a socket formed therein to receive said pintle for support thereby.

5. The apparatus defined by claim 4, wherein the bearing surface of the bracket member comprises a washer affixed to said horizontal leg portion and surrounding the pintle.

6. Apparatus for winding and storing tape of a predetermined width, comprising:

a. a cartridge container constructed to accommodate a roll of said tape, the container formed from a pair of identical cartridge members each of which comprises 1. a retaining side wall having a slotted opening through which the tape can pass;

2. and a bottom having an opening centrally disposed therein to cooperate with the center of the tape roll;

b. the respective slotted openings being disposed to align and thereby form a tape slot, and the respective bottom openings being axially aligned;

c. and a winding reel comprising 1. a base 2. a spindle affixed to the base and removably insertable into the cartridge container through the aligned openings of said cartridge members, the spindle constructed to receive and retain a tape and inserted through the tape slot;

3. and handle means disposed eccentrically on the side of the base opposite the reel spindle;

d. the winding reel being manually rotatable by said handle means relative to the cartridge container to wind the tape and thereby form a roll.

7. The apparatus defined by claim 6, wherein:

a. the base of the winding reel is circular in shape, and further comprises a raised peripheral edge;

b. and the bottom of each cartridge member has a circular recess formed therein to receive the raised peripheral edge in bearing relation.

8. The apparatus as defined by claim 6, wherein the reel spindle comprises a plurality of essentially parallel finger members paced to receive a tape end therebetween.

9. The apparatus as defined by claim 6, wherein the inner side of the retaining side wall is constructed to form a slotted recess for receiving an identification label.

10. The apparatus as defined by claim 6, wherein each essentially identical cartridge member further comprises at least one pintle-socket pair arranged to frictionally merge with the pintle-socket pair of another such identical member.

* * * * *